US012145149B2

(12) United States Patent
Hammerstad et al.

(10) Patent No.: US 12,145,149 B2
(45) Date of Patent: Nov. 19, 2024

(54) DISPOSABLE MICROFLUIDIC CASSETTES

(71) Applicant: Hewlett-Packard Development Company, L.P., Spring, TX (US)

(72) Inventors: Diane R. Hammerstad, Corvallis, OR (US); Alexander Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 803 days.

(21) Appl. No.: 17/415,916

(22) PCT Filed: Mar. 8, 2019

(86) PCT No.: PCT/US2019/021458
§ 371 (c)(1),
(2) Date: Jun. 18, 2021

(87) PCT Pub. No.: WO2020/185200
PCT Pub. Date: Sep. 17, 2020

(65) Prior Publication Data

US 2022/0080413 A1 Mar. 17, 2022

(51) Int. Cl.
*B01L 3/00* (2006.01)

(52) U.S. Cl.
CPC ..... *B01L 3/502715* (2013.01); *B01L 2200/04* (2013.01); *B01L 2200/16* (2013.01); *B01L 2300/0663* (2013.01); *B01L 2300/0896* (2013.01); *B01L 2300/1822* (2013.01); *B01L 2300/1827* (2013.01)

(58) Field of Classification Search
CPC ............. B01L 2200/04; B01L 2200/16; B01L 2300/0663; B01L 2300/0896; B01L 2300/1822; B01L 2300/1827; B01L 3/0268; B01L 3/502715
See application file for complete search history.

(56) References Cited

U.S. PATENT DOCUMENTS

| | | | | |
|---|---|---|---|---|
| 9,663,819 | B2 | 5/2017 | Jovanovich et al. | |
| 9,752,185 | B2 | 9/2017 | Boronkey et al. | |
| 10,018,589 | B2 | 7/2018 | Onuma | |
| 10,131,901 | B2 | 11/2018 | Abrams et al. | |
| 2011/0256551 | A1* | 10/2011 | Linder | B01L 3/5027 435/7.1 |
| 2012/0040470 | A1 | 2/2012 | Dorn et al. | |
| 2016/0310948 | A1 | 10/2016 | Nowakowski et al. | |
| 2016/0370319 | A1 | 12/2016 | Molho et al. | |
| 2018/0221870 | A1 | 8/2018 | Domingue et al. | |

(Continued)

FOREIGN PATENT DOCUMENTS

| | | |
|---|---|---|
| WO | 2011130629 | 10/2011 |
| WO | 2015116956 | 8/2015 |

*Primary Examiner* — Jennifer Wecker
(74) *Attorney, Agent, or Firm* — Foley & Lardner LLP

(57) ABSTRACT

A disposable microfluidic cassette can include a substrate and an engagement feature associated with the substrate to removably join the cassette with a cassette-receiver of an analytical system. A microfluidic network can be carried by the substrate. The microfluidic network can include a fluid inlet, a fluid outlet, and a sample manipulation portion fluidly coupling the fluid inlet to the fluid outlet. An ejector can be associated with the microfluidic network to move fluid out of the disposable microfluidic cassette via the fluid outlet.

12 Claims, 4 Drawing Sheets

(56) References Cited

U.S. PATENT DOCUMENTS

| | | | | |
|---|---|---|---|---|
| 2018/0305747 | A1 | 10/2018 | Link | |
| 2018/0311661 | A1* | 11/2018 | Inoue | B01L 3/0268 |
| 2019/0351088 | A1* | 11/2019 | Gruenbacher | A61L 9/122 |
| 2020/0200670 | A1* | 6/2020 | Cho | G01N 15/1459 |

* cited by examiner

DISPOSABLE MICROFLUIDIC CASSETTES

BACKGROUND

Microfluidics involves the flow of relatively small volumes of a fluid within micrometer-sized channels or smaller. However, the microfluidic behavior of a fluid can differ from the macrofluidic behavior of a fluid. For example, fluid properties such as surface tension and fluidic resistance can play a more dominant role in the microfluidic behavior of fluids than they do on the macroscopic level. Microfluidic systems have many diverse applications in areas such as engineering, physics, chemistry, biochemistry, biotechnology, etc., and can have practical applications in the design of systems in which low volumes of fluid can be processed to achieve multiplexing.

DETAILED DESCRIPTION

Figure 1A:
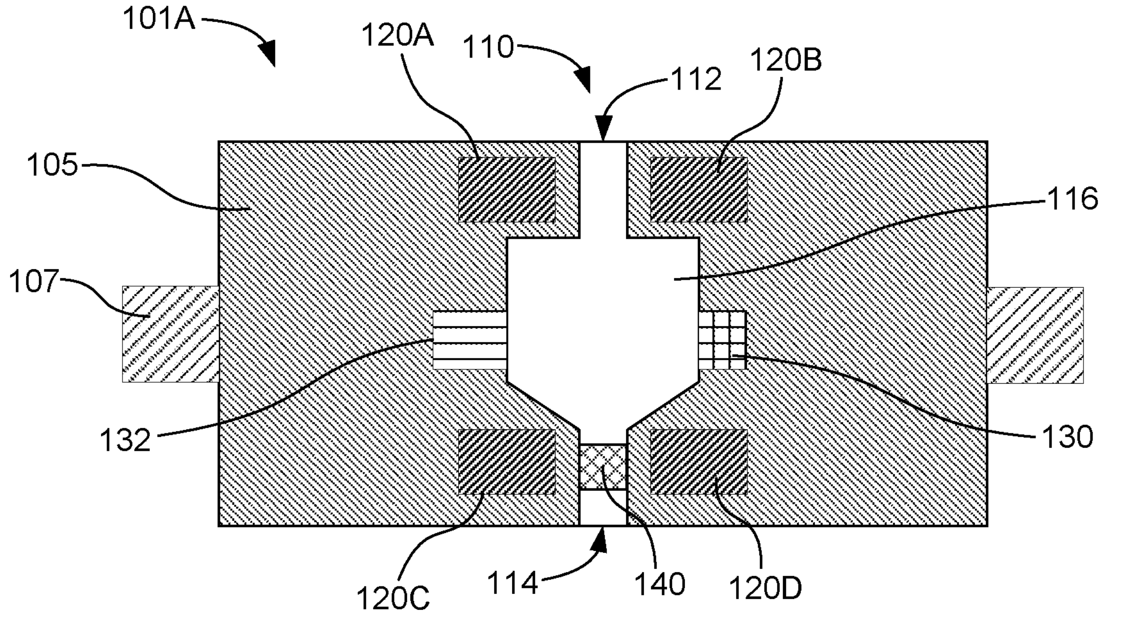
FIG. 1A is a cross-sectional view of a disposable microfluidic cassette in accordance with the present disclosure.

Medical testing, biological testing, drug screening, or the like, often demand a variety of analytical tests to properly evaluate the sample. As such, these procedures often involve relatively large sample sizes to meet the standards of the testing protocol. Further, such testing generally involves high reagent redundancy and reagent volumes to accommodate the large sample sizes. Further still, sample multiplexing of such samples can be highly complex, tedious, and time-consuming. Thus, reducing sample volumes can reduce corresponding reagent volumes for a particular testing protocol, which can reduce expense and sample volume requirements. Further still, automating dispensing of reagents and sample manipulation can reduce the burden and time of analysts on complex analytical procedures. The present disclosure is directed to disposable microfluidic cassettes, analytical systems, and methods of manipulating a sample that can address or improve a variety of these problems by minimizing sample sizes and allowing for a high degree of programmable automation in reagent dispensing and sample manipulation. Further, the disposable microfluidic cassettes, analytical systems, and methods of manipulating a sample can facilitate substantial parallel fluid processing in microfluidic channels.

In an example of a disposable microfluidic cassette, the disposable microfluidic cassette includes a substrate, an engagement feature associated with the substrate to join the cassette with a cassette-receiver of an analytical system, a microfluidic network carrier by the substrate, and an ejector associated with the microfluidic network to move fluid out of the disposable microfluidic cassette via the fluid outlet. The microfluidic network includes a fluid inlet, a fluid outlet, and a sample manipulation portion fluidly coupling the fluid inlet to the fluid outlet. In one example, the microfluidic network has a volume of from 0.5 picoliters (pL) to 1 milliliter (mL). In another example, the ejector includes a piezoelectric ejector, a thermal ejector, an electrostatic actuator, an acoustic ejector, or a combination thereof. In yet another example, the disposable microfluidic cassette further includes a sample manipulation component associated with the sample manipulation portion, the sample manipulation component selected from a temperature regulator, a thermal cycler, an ultrasonic transducer, a piezoelectric appliance, an integrated micropump, a mixer, a lyser, a particle sorter, a valve, or a combination thereof. In still another example, the disposable microfluidic cassette includes a detector positioned to detect a measurable characteristic of a processed fluid within the microfluidic network. In a further example, the engagement feature of the disposable microfluidic cassette is mechanically joinable with a corresponding engagement feature of the cassette-receiver of the analytical system.

In an example of an analytical system, the system includes a fluid dispenser device including a fluid reservoir in fluid communication with a fluid ejector and a disposable microfluidic cassette positionable in operational relation to the fluid dispenser device. The disposable microfluidic cassette includes a microfluidic network and an ejector associated with the microfluidic network to remove processed fluid from the disposable microfluidic cassette via the fluid outlet. The microfluidic network includes a fluid inlet to receive fluid from the fluid ejector when positioned in operational relation to the fluid dispenser device, a fluid outlet, and sample manipulation fluidics fluidly coupling the fluid inlet to the fluid outlet where fluid is manipulated to form a processed fluid. In another example, the analytical system further includes a cassette-receiver adjacent the fluid dispenser device to receive the disposable microfluidic cassette in position to receive fluid at the fluid inlet. In an additional example, the fluid reservoir includes a sample fluid reservoir, a reagent fluid reservoir, or both. In another example, the sample manipulation fluidics are pre-loaded with sample to interact with the fluid after being introduced within the disposable microfluidic cassette. In yet another example, the analytical system further includes a carriage coupled to the fluid dispenser, the cassette-receiver, or both, to move the fluid dispenser device relative to the cassette-receiver. In still another example, the analytical system further includes a fluid receiver device to receive the processed fluid via the fluid outlet. In a further example, the fluid receiver device includes a detector positioned to detect a measurable characteristic of the processed fluid after being received from the fluid outlet.

In an example of a method of manipulating a sample, the method includes ejecting a fluid from a fluid ejector to a microfluidic network of a disposable microfluidic cassette where the fluid is a sample fluid, a reagent fluid, or both, manipulating the fluid within the microfluidic network to generate a processed fluid, and ejecting the processed fluid from the disposable microfluidic cassette onto or into a fluid receiver device. In a further example, manipulating includes processing the fluid to include mixing, thermal cycling, washing, eluting, lysing, separating, sorting, transfecting, reacting, assaying, or a combination thereof, and wherein the fluid receiver device receives the processed fluid as waste, for assay, for further fluid manipulation, or a combination thereof.

In addition to the examples described above, the disposable microfluidic cassettes, analytical systems, and methods of manipulating a sample will be described in greater detail below. It is also noted that when discussing the disposable microfluidic cassettes, analytical systems, and methods of manipulating a sample described herein, these relative discussions can be considered applicable to the other examples, whether or not they are explicitly discussed in the context of that example. Thus, for example, in discussing a detector related to a disposable microfluidics cassette, such disclosure is also relevant to and directly supported in the context of the analytical systems and methods of manipulating a sample described herein, and vice versa.

In further detail, the disposable microfluidic cassettes described herein can include or be formed of a variety of substrate materials. Generally, the substrate material can include a material in which a microfluidic network can be formed using microfabrication technologies. Non-limiting examples can include silicon, stainless steel, photoresist (e.g., SU-8, for example), polydimethylsiloxane (PDMS), cyclic olefin copolymer (COC), glass, quartz, compression moldable resins and the like, or a combination thereof.

An engagement feature can be associated with the substrate to removably join the disposable microfluidic cassette with a cassette-receiver of an analytical system. In other examples, the engagement feature can be joined and not removable, which may be present for a more monolithic example where a disposable microfluidic cassette may house or become otherwise join the ejector. In this example, the system including the ejector portion could be disposable, e.g., the sample could be added into the system to be received by a manipulating chamber or channel and the fluid moved from one chip to another surface.

In some examples, the engagement feature can be formed as part of the substrate, such that the engagement feature and the substrate are part of a monolithic unit. In other examples, the engagement feature can be separately formed and attached to the substrate, such as using an adhesive, sintering, welding, clamping, friction fitting, the like, or a combination thereof.

The engagement feature can be designed to removably (or otherwise) join the disposable microfluidic cassette with a cassette-receiver. In some examples, the engagement feature can include an exterior surface geometry that is particularly shaped, sized, the like, or a combination thereof to be specifically received by a slot, tray, or the like of a cassette-receiver. In some examples, the disposable microfluidic cassette and the cassette-receiver can be designed to have corresponding magnetic components to align and removably or otherwise join the cassette to the cassette-receiver via a magnetic interaction or coupling. In some examples, the engagement feature of the disposable microfluidic cassette can be mechanically joinable with a corresponding engagement feature of the cassette-receiver. By "mechanically joinable," it is to be understood that the disposable microfluidic cassette and the cassette-receiver can be joined via any suitable mechanical interaction, such as friction fitting, clamping, clipping, pinning, strapping, fastening, cinching, the like, or a combination thereof. As one non-limiting example, the engagement feature of the cassette can include a rail or runner that can slidably engage a groove or the like of a cassette-receiver, or vice versa. In another non-limiting example, the engagement feature of the cassette can include a clip, clamp, or the like that can engage a groove, slot, lip, or other mating feature of the cassette-receiver, or vice versa. It is noted that any suitable combination of the referenced engagement features, or the like, can also be used. For example, in another arrangement, the cassette may be welded or otherwise connected with the cassette receiver and the microfluidic network as a unitary system can be consumable. For example, this can operate like a consumable that receives a sample, and the sample can be ejected onto a permanent cassette to be manipulated to generate a processed fluid.

A microfluidic network can be formed in or carried by the substrate. The microfluidic network can include a fluid inlet, a fluid outlet, and a sample manipulation portion fluidly coupling the fluid inlet to the fluid outlet. Likewise, there can be multiple sample manipulation portions with respective fluid inlets and fluid outlets associated therewith. Thus, the term "fluidly coupling" when referring to a sample manipulation portion(s) relative to a fluid inlet and a fluid outlet should be interpreted with some breadth with respect to how fluid, when present, interacts with the microfluidic network as a whole. For example, a fluid inlet and a fluid outlet can be connected by a fluidic pathway that is associated with or includes the sample manipulation portion of the microfluidic network. It is further noted that "fluid coupling" can refer to contiguous or non-contiguous fluid systems or fluid segments, e.g., including air gaps within microfluidic channels, air gaps where fluid exits and re-enters the microfluidic network, immiscible fluid segments, non-homogenous fluid segments, the like, or a combination thereof. The microfluidic network can have a variety of pathway designs, such as vertical, horizontal, diagonal, straight, curved, twisting, serpentine, the like, or a combination thereof. Further, the microfluidic network can include a single sample manipulation portion, multiple sample manipulation portions one or multiple fluid inlets and/or one or multiple fluid outlets, connected in series and/or parallel. The microfluidic network, for example, can generally have a volume of from 0.5 picoliters (pL) to 1 milliliter (mL). If there are several sample manipulation regions, the volumes can be larger. In other examples, the microfluidic network can have a volume of from 1 nL to 10 μL.

The fluid inlet can be shaped in a variety of suitable ways. In some examples, the fluid inlet can be shaped as a funnel to facilitate reception of fluid into the microfluidic network. In other examples, the fluid inlet can be shaped to receive a fluid dispensing nozzle or tip that can be temporarily or permanently positioned at or in the fluid inlet. In other examples the fluid inlet can be shaped to have a diameter matching the sample manipulation portion of the microfluidic network.

Similarly, the fluid outlet can be shaped in a variety of suitable ways. In some examples, the fluid outlet can be shaped to have a diameter matching the sample manipulation portion of the microfluidic network. In other examples, the fluid outlet can be shaped to accommodate sealed transfer, or the like, of fluid from the microfluidic network to a separate chip, chamber, or device.

The microfluidic network can be designed in a variety of ways. For example, in some cases, the microfluidic network can include a microfluidic channel having a uniform or substantially uniform diameter from the fluid inlet to the fluid outlet. In other examples, the microfluidic network can include microfluidic channel portions having a narrowed diameter to manipulate the sample in a specific way. In still other examples, the microfluidic network can include one or more fluid chambers or microfluidic channel portions having an expanded diameter to allow accumulation of larger volumes of fluid. In some examples, the microfluidic network can include open or closed channels, open or closed chambers, micro-arrays, the like, or a combination thereof. Thus, the microfluidic network can include a variety of microfluidic portions or segments.

In some examples, various microfluidic portions can be separated or segregated by a valve or the like, such as a capillary valve, a shatter valve, a solenoid valve, a quake valve, an ejector, an inertial pump, the like, or a combination thereof. It is noted that, as described herein, the sample manipulation portion of the microfluidic network can include any suitable number and type of valve or the like and still fluidly connect the fluid inlet and the fluid outlet. Thus, the presence of a valve (e.g. a shatter valve, or the like) can be part of the sample manipulation portion while maintaining fluid connection between the fluid inlet and the fluid outlet.

In some examples, the sample manipulation portion of the microfluidic network can include specific features for manipulating a sample fluid directly. For example, the sample manipulation portion can include a narrowed diameter to induce mechanical strain on a cell wall or cell membrane to cause or facilitate cell lysis. In some additional examples, the sample manipulation portion can include micro-protrusions extending from an inner wall thereof to facilitate lysing of cells. In other examples, the, sample manipulation portion can be shaped to induce turbulent flow of the sample fluid to facilitate mixing of the sample fluid with a reagent fluid, for example. In some further examples, the sample manipulation portion can include a separations component or media, such as an affinity ligand, ion exchange resin, gel permeation/size exclusion media, hydrophobic/hydrophilic interaction media, the like, or a combination thereof for isolating, separating, retaining, eluting, the like, or a combination thereof a particular component or components of a sample fluid.

In some additional examples, the sample manipulation portion can further include a manipulation component associated therewith to facilitate manipulation of a sample fluid. Non-limiting examples of manipulation components that can be included along the sample manipulation portion can include a temperature regulator (i.e. a heat transfer component for heating, cooling, or both), an ultrasonic transducer, a piezoelectric appliance, an electrode, an integrated micropump, a mixer, a lyser, a particle sorter, a valve or microfluidic switch for microfluidic flow routing, the like, or a combination thereof.

For example, a variety of temperature regulators can be used along the sample manipulation portion for heating the sample fluid, cooling the sample fluid, or both (e.g. for thermocycling, for example). Non-limiting examples of temperature regulators can include an electrical resistor, a Peltier heat pump, a heat transfer fluid, chemical reactions (e.g. phase change, combustion, etc.), irradiation (e.g. infrared, microwave, solar, ultraviolet, ultrasound, etc.), a heat sink, forced convection, the like, or a combination thereof.

In some examples, ultrasonic transducers can be employed along the sample manipulation portion. Ultrasonic transducers are transducers that can convert an electrical signal (e.g. AC current) into ultrasound, and vice versa. In some examples, the ultrasonic transducer can be a piezoelectric transducer, a capacitive transducer, the like, or a combination thereof. In some examples, the ultrasonic transducer can be employed to emit a high energy sonic wave capable of lysing cells, or for other suitable purpose.

A variety of piezoelectric appliances can also be employed along the sample manipulation portion. Piezoelectric appliances can include a piezoelectric actuator, a piezoelectric motor, the like, or a combination thereof. Piezoelectric appliances can be employed to for a variety of reasons, such as to induce vibrations, agitation, the like, or a combination thereof to facilitate mixing or reacting of a sample fluid with a reagent fluid, for example. Piezoelectric appliances can also be used to manipulate a sample fluid in a variety of other ways, such as thermal regulators, ultrasonic transducers, etc.

As another example, an electrode is an electrochemical cell that can be employed to manipulate a sample fluid in a variety of ways, such as via electrolysis, to deliver an electrical current to a sample fluid, to induce oxidation, the like, or a combination thereof. Sample manipulation components can also include an integrated micropump (e.g. an ejector, an inertial pump, etc.), a mixer, a lyser, a particle sorter, a valve (e.g. a quake valve, a shatter valve, a capillary valve, a solenoid valve, etc.), or the like.

An ejector associated with the microfluidic network can transfer fluids from one network to another, can act as a valve or the like to segregate portions of the microfluidic network into distinct regions, can move fluid along the microfluidic network at a controllable rate, the like, or a combination thereof. Thus, in some examples, the ejector can move fluid along the microfluidic network at a constant rate. In other examples, the ejector can move fluid along the microfluidic network intermittently or at variable rates. In some further examples, the ejector can move fluid out of the disposable microfluidic cassette via the fluid outlet. In some examples, ejectors can be spaced throughout the microfluidic network to segregate different portions of the microfluidic network intended for different purposes, such as separate fluid manipulations, manipulation and detection, the like, or a combination thereof. A variety of ejectors and integrated micropumps can be employed in the disposable microfluidic cassette. Non-limiting examples can include a piezoelectric actuator or ejector, a thermal ejector, an electrostatic actuator, an acoustic ejector, the like, or a combination thereof.

In some examples, the disposable microfluidic cassette can include a detector positioned to detect a measurable characteristic of a fluid, such as a pre-processed fluid (e.g. to establish a baseline signal, for example), a processed fluid, or a combination thereof. In some examples, the detector, or a portion thereof, can be positioned to directly contact a fluid in the microfluidic network (e.g. an electrode, for example). In other examples, the detector is positioned to not directly contact a fluid in the microfluidic network (e.g. an optical detector, for example). Depending on the sample type, and the type of sample manipulation employed by the disposable microfluidic cassette, a variety of detectors can be useful to monitor a fluid introduced to the disposable microfluidic cassette. Non-limiting examples of detectors can include an optical detector (e.g. a photoconductive detector, a photovoltaic detector, a photodiode detector, a phototransistor detector, etc.), an electrochemical detector (e.g. an amperometric detector, a potentiometric detector, a coulometric detector, a voltammetric detector, etc.), a piezoelectric detector (e.g. a pressure detector, an ultrasonic detector, etc.), the like, or a combination thereof.

The disposable microfluidic cassette can include a variety of additional components, depending on the particular application of the disposable microfluidic cassette. For example, the disposable microfluidic cassette can include an embedded power source, an electronic driver, a signal amplifier, an integrated microprocessor, a memory component, a communications component (e.g. a transceiver), the like, or a combination thereof. As such, in some examples, the disposable microfluidic cassette can operate independently from an external system. In other examples, the disposable microfluidic cassette can operate when suitably coupled to or positioned within a receiving analytical system.

FIG. 1A illustrates one non-limiting example of a disposable microfluidic cassette 101A. The disposable microfluidic cassette includes a substrate 105 and an engagement feature 107 associated with the substrate to removably or otherwise join the cassette with a cassette-receiver of an analytical system. A microfluidic network 110 is carried by the substrate. The microfluidic network includes a fluid inlet 112, a fluid outlet 114, and a sample manipulation portion 116 fluidly coupling the fluid inlet to the fluid outlet. In this particular example, the sample manipulation portion includes a segment shaped as a chamber or reservoir that can be used to accumulate fluid for sample manipulation. For example, a plurality of sample manipulation components 120A, 120B, 120C, 120D can be positioned in close proximity to the sample reservoir of the sample manipulation portion. Sample manipulation components 120A and 120B can represent Peltier heat pumps for cooling a fluid within the sample manipulation portion. Sample manipulation components 120C and 120D can represent resistive heaters for heating a fluid within the sample manipulation portion. Thus, the sample manipulation components can be employed to thermocycle a fluid within the sample manipulation portion. An ejector 140 is positioned to control movement of fluid along the microfluidic network, such as to initially collect fluid within the reservoir and subsequently move fluid out of the disposable microfluidic cassette via the fluid outlet. In this particular example, a detector 130 can also be included in the disposable microfluidic cassette. In this case, the detector can be a fluorescence detector. A light source 132 can be positioned to emit electromagnetic radiation at a wavelength to elicit a fluorescent emission from a nucleic acid binding die, for example, to monitor amplification of a nucleic acid strand during thermocycling.

Figure 1B:
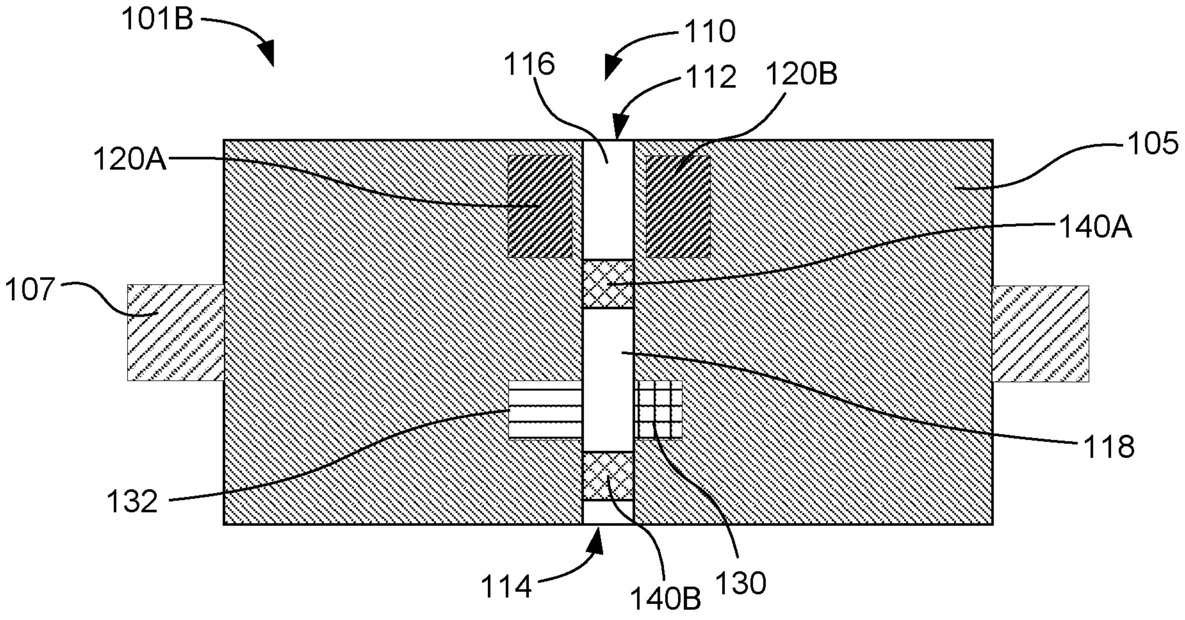
FIG. 1B is a cross-sectional view of another disposable microfluidic cassette in accordance with the present disclosure.

FIG. 1B illustrates an alternative example of a disposable microfluidic cassette 101B. In this example, the disposable microfluidic cassette includes a similar substrate 105 and engagement feature 107. However, the microfluidic network 110 is somewhat modified. More specifically, the microfluidic network has a fluid inlet 112, a fluid outlet 114, a fluid manipulation portion 116 that includes a sample detection portion 118. In other words, the fluid manipulation portion has been segmented by a first ejector 140A and a second ejector 140B to include separate portion for sample manipulation and sample detection.

Thus, a polymerase chain reaction (PCR) sample, for example, can be introduced into sample manipulation portion 116 where the sample can be thermocycled using resistive heater 120A and Peltier cooler 120B. The sample can then be ejected from the sample manipulation portion using ejector 140A into the sample detection portion 118 where a light source 132 can emit electromagnetic radiation at a wavelength to elicit a fluorescent emission from a nucleic acid binding die in the sample fluid. The fluorescent emission can be detected by fluorescence detector 130 to determine a level of nucleic acid amplification achieved in the sample manipulation portion of the microfluidic network 110. In some examples, the ejector 140A can be adapted to move fluid in one direction. In other examples where insufficient amplification may have occurred, the ejector or another ejector can be used to reintroduce the sample fluid back into the sample manipulation portion. Where sufficient amplification was achieved, the second ejector 140B can move sample fluid out of the disposable microfluidic cassette via outlet 114. Alternatively, where the sample fluid is not needed for collection or further processing, the disposable microfluidic cassette can be disposed without ejecting the sample fluid via the second ejector.

The disposable microfluidics cassettes described herein can be incorporated into an analytical system. The analytical system can include a fluid dispenser device including a reagent fluid reservoir in fluid communication with a reagent fluid ejector. The fluid dispenser device can include a single reagent fluid reservoir or a plurality of reagent fluid reservoirs. The reagent fluid reservoir can be a replenishable reagent fluid reservoir that is fixed to the fluid dispenser device or the reagent fluid reservoir can be in the form of a replaceable cartridge, or the like. In some specific examples, reagent fluid reservoirs can be interchangeable between analytical systems. The reagent fluid ejector can be a piezoelectric ejector, a thermal ejector, or the like. In some specific examples, the reagent fluid ejector can be a thermal inkjet ejector.

In some examples, the analytical system can be a dedicated analytical system for a particular analytical procedure. Where this is the case, the dedicated analytical system can include, in some cases, a dedicated fluid dispenser device including a reagent fluid reservoir that consistently includes the same reagent fluid. In other examples, the reagent fluid reservoir can be interchangeable to accommodate some customization within the scope of the intended analytical procedure.

In other examples, the analytical system can be a universal or non-dedicated analytical system that can be customized to perform a variety of analytical procedures depending on the particular disposable microfluidic cassette loaded to the analytical system, for example. Where this is the case, the reagent fluid reservoir can be interchangeable to accommodate a variety of analytical procedures with a high degree of customization and flexibility.

A variety of reagent fluids can be dispensed by the fluid dispenser device, depending on the particular analytical procedure to be employed. Non-limiting examples can include water, lysing reagents, washing reagents, buffering reagents, detection reagents, denaturing reagents, amplification reagents, polymerization reagents, blocking reagents, reactants, eluting reagents, the like, or a combination thereof. In some examples, a reagent can be pre-loaded to the disposable microfluidic cassette in a dry or powder form and subsequently dissolved, dispersed, or activated by the addition of a fluid (e.g. water, a buffer, a sample fluid, etc.) to the dry or powder reagent.

In some examples, the fluid dispenser device can further include a sample fluid reservoir in fluid communication with a sample fluid ejector. Where this is the case, the fluid dispenser device can be employed to dispense sample fluid in a customized manner to the disposable microfluidic cassette. Further, the sample fluid reservoir can be interchangeable to allow for multiple samples to be dispensed in parallel or sequence on a single analytical system, for a single sample fluid reservoir to be transferred to a plurality of different analytical systems, or a combination thereof. The reagent fluid ejector can be a piezoelectric ejector, a thermal ejector, or the like. In some specific examples, the reagent fluid ejector can be a thermal inkjet ejector.

In other examples, the sample can be pre-loaded to the disposable microfluidic cassette to interact with reagent fluid subsequently introduced to the disposable microfluidic cassette via the fluid dispenser device. The sample can be in fluid form or dry form.

Other fluids can include sacrificial fluids, driving fluids, washing fluids, or the like that do not contact the reagent fluid or the sample fluid. These fluids can be used to move other fluids through the microfluidic network, prepare the microfluidic network for subsequent sample introduction, manipulation, or a combination thereof, or the like.

Thus, depending on the analytical system and the design of the disposable microfluidic cassette, the sample fluid can be used in a variety of analytical procedures on a single analytical system or a plurality of analytical systems for multiplexed sample analysis. For example, a variety of reagent fluids can be dispensed in a customized manner with respect to type of reagent, amount of reagent, etc. in combination with the sample fluid using a single analytical system or a plurality of analytical systems in sequence or in parallel. Further still, the disposable microfluidic cassette can be programmed to manipulate the sample fluid and reagent fluid to process the sample fluid and reagent fluid in a variety of ways using a single analytical system or a plurality of analytical systems in sequence or in parallel.

A variety of samples can be loaded (e.g. pre-loaded or dispensed via the fluid dispenser device) to the disposable microfluidic cassette for analysis. Non-limiting examples can include medical samples (e.g. blood samples, urine samples, saliva samples, swab samples, etc.), biological samples (e.g. nucleic acid samples, protein samples, microbe samples, etc.), chemical samples (e.g. drug samples, polymer samples, synthetic pre-cursor samples, reactants, etc.), research samples, the like, or a combination thereof.

The disposable microfluidic cassette can be incorporated or coupled to the analytical system in a variety of ways. In some examples, the analytical system can include a slot, space, or the like where the disposable microfluidic cassette can be removably positioned adjacent to or in operational relation to the fluid dispenser device. In some specific examples, the analytical system can include a cassette-receiver adjacent the fluid dispenser device to receive the disposable microfluidic cassette in position to receive the reagent fluid at the fluid inlet. In some examples, the cassette-receiver can accommodate a single disposable microfluidic cassette. In other examples, the cassette-receiver can accommodate a plurality of disposable microfluidic cassettes (e.g. in a side-by-side relationship). In other examples, the analytical system can include a plurality of cassette-receivers (e.g. in a side-by-side relationship) to accommodate a plurality of disposable microfluidic cassettes in operational relation to the fluid dispenser device to receive a fluid dispensed therefrom via a fluid inlet.

In some additional examples, the analytical system can include a fluid receiver device positioned to receive a processed or manipulated fluid via a fluid outlet of a microfluidic network of the disposable microfluidic cassette. In some examples, the fluid receiver device can be a waste receptacle. In other examples, the fluid receiver device can be a separate chip or active device for further processing or detection of the processed fluid. Thus, in some examples, the fluid receiver device can include a detector positioned to detect a measurable characteristic of the processed fluid after being received via the fluid outlet. In some further examples, the fluid receiver device can further include an ejector to eject processed fluid therefrom after detection. In some further examples, the fluid receiver device can include additional sample manipulation components for further manipulation of a processed sample during or in preparation for detection by a detector. In some specific examples, the fluid receiver device can also be disposable, such as a second disposable microfluidic cassette, or other disposable chip or active device. In other examples, the fluid receiver device is a permanent feature of the analytical system. In some additional examples, the fluid receiver device can include a cassette-receiver to receive a disposable microfluidic cassette therein. Where this is the case, the fluid receiver device can be disposable or permanent. Thus, in some specific examples, the disposable microfluidic cassette can be loaded to a disposable fluid receiver device and both can be discarded together after sample manipulation.

Figure 2:
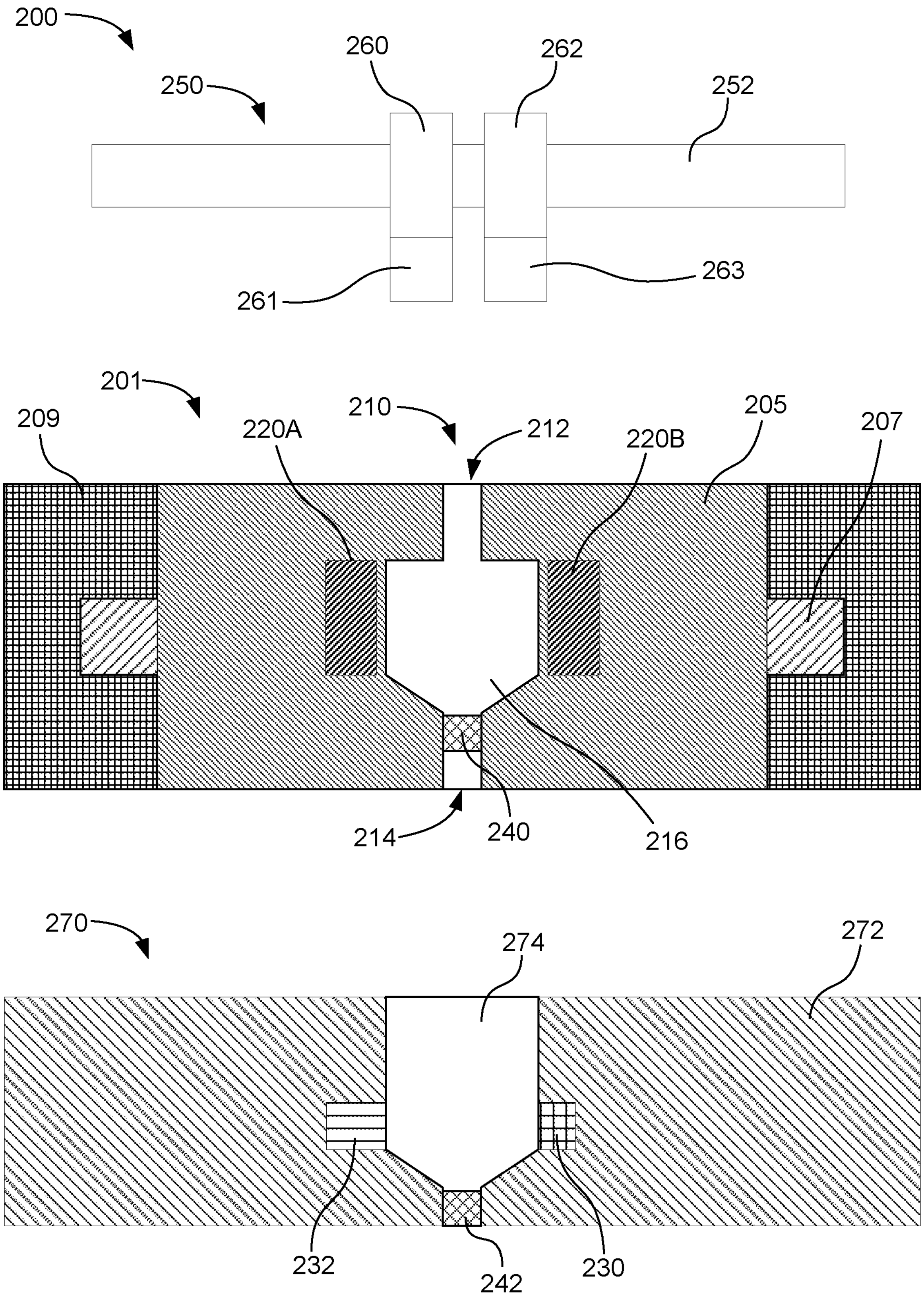
FIG. 2 is a schematic representation of an analytical system in accordance with the present disclosure.

One non-limiting example of an analytical system 200 is illustrated in FIG. 2. The analytical system can include a fluid dispenser device 250 including a reagent fluid reservoir 262 in fluid communication with a reagent fluid ejector 263. In this particular example, the fluid dispenser device further includes a sample fluid reservoir 260 in fluid communication with a sample fluid ejector 261. The reagent fluid reservoir and the sample fluid reservoir are coupled to a housing 252.

A disposable microfluidic cassette 201 is removably positioned, or movably positioned, in operational relation to the fluid dispenser device 250. In this particular example, the disposable microfluidic cassette is coupled to a cassette-receiver 209 of the analytical system. A microfluidic network 210 is carried by substrate 205 of the disposable microfluidic cassette. The disposable microfluidic cassette is positioned to receive fluid (e.g. sample fluid and reagent fluid) within the microfluidic network via fluid inlet 212. The sample fluid and reagent fluid can be manipulated within the sample manipulation portion 216 of the microfluidic network to form a processed or manipulated fluid. For example, resistive heater 220A and Pelteir cooler 220B can be employed to thermocycle the sample fluid and reagent fluid to prepare a processed or thermocycled fluid. The processed fluid can be ejected out of the disposable microfluidic cassette via outlet 214 using ejector 240.

Fluid receiver device 270 of the analytical system 200 can received the processed fluid ejected from the disposable microfluidic cassette 201 within detection chamber or channel 274 carried by substrate 272. A light source 232 can emit electromagnetic radiation to elicit a fluorescent emission from a nucleic acid binding die to determine an amount of amplified nucleic acid in the processed sample. The fluorescent emission can be detected by fluorescence detector 230. Once the sample has been analyzed, ejector 242 can eject the processed sample from the fluid receiver device or transfer the processed sample to a separate waste collection chamber (not shown).

Figure 3A:
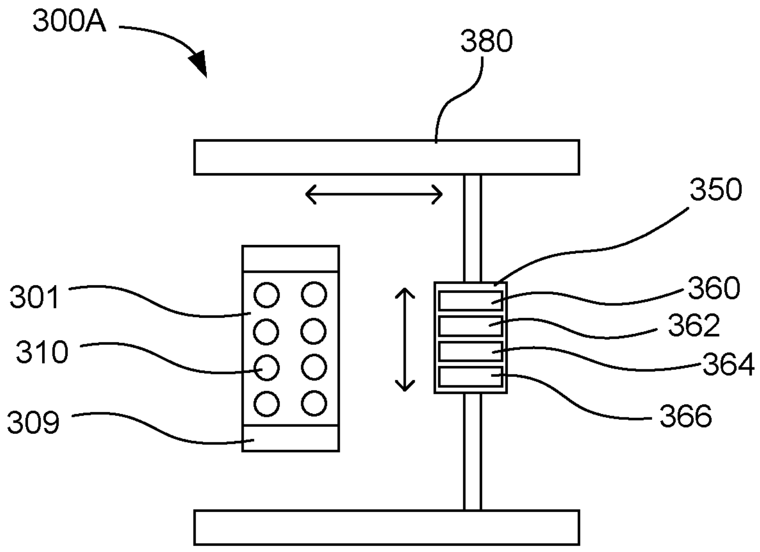
FIG. 3A is a schematic representation of an analytical system including a carriage in accordance with the present disclosure.

FIG. 3A illustrates an additional example of an analytical system 300A. In this example, the fluid dispenser device 350 includes a sample fluid reservoir 360, and a plurality of reagent fluid reservoirs 362, 364, 366. The fluid dispenser device is further coupled to a carriage 380 to move the fluid dispenser device relative to the disposable microfluidic cassette 301. In this example, the disposable microfluidic cassette is removably coupled to cassette-receiver 309. Further, the disposable microfluidic cassette includes a plurality of microfluidic networks 310. Thus, the fluid dispenser device can dispense customized amounts of sample fluid and customized reagent fluids in customized amounts to individual microfluidic networks of the disposable microfluidic cassette.

Figure 3B:
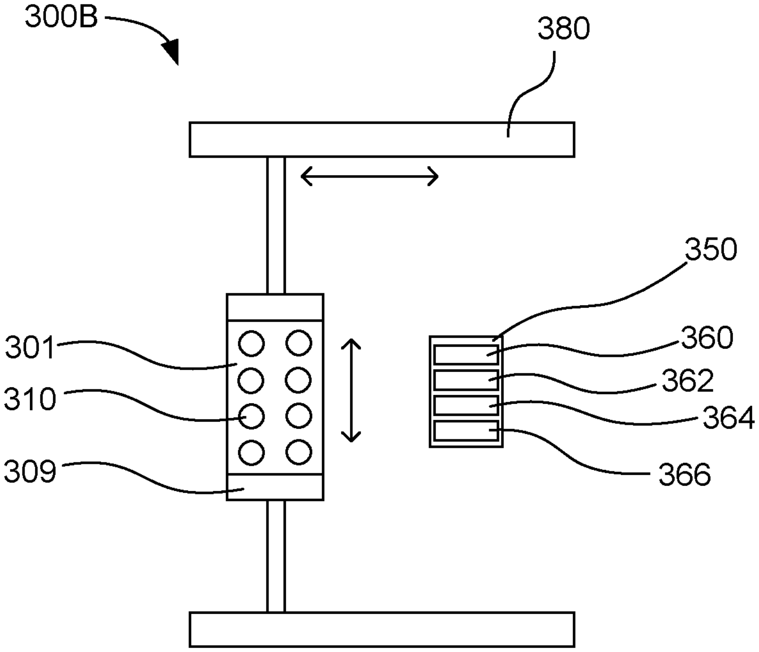
FIG. 3B is a schematic representation of another analytical system including a carriage in accordance with the present disclosure.

FIG. 3B illustrates an alternative example of an analytical system 300B. In this example, all components are the same as depicted in FIG. 3A except that the carriage 380 is coupled to the cassette-receiver 309 to move the disposable microfluidic cassette 301 relative to the fluid dispenser device 350. In still other examples, the fluid dispenser device and the cassette-receiver, or the like, can each be coupled to a carriage (not shown) so that the disposable microfluidic cassette and the fluid dispenser device can each move relative to one another. Further, where the cassette-receiver, or the like, is coupled to a carriage, the disposable microfluidic cassette can also move relative to a fluid receiver device, where present.

Figure 4:
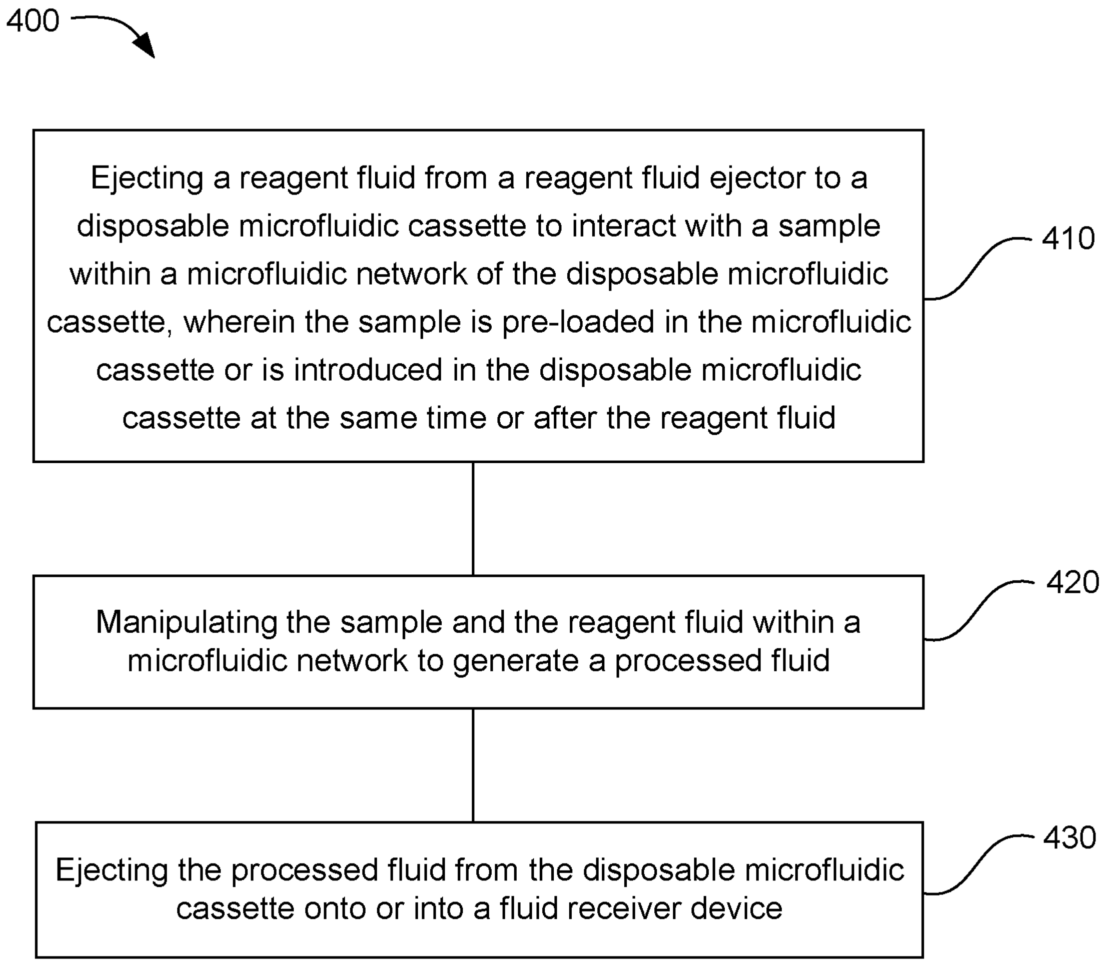
FIG. 4 is a flow chart illustrating an example method of manipulating a sample in accordance with the present disclosure.

As presented in the flow chart of FIG. 4, the present disclosure also describes a method 400 of manipulating a sample. The method can include ejecting 410 a reagent fluid from a reagent fluid ejector into to a disposable microfluidic cassette to interact with a sample within a microfluidic network of the disposable microfluidic cassette, wherein the sample is pre-loaded in the microfluidic cassette or is introduced in the disposable microfluidic cassette at the same time or after the reagent fluid. The method can further include manipulating 420 the sample and the reagent fluid within a microfluidic network to generate a processed fluid. Additionally, the method can include ejecting 430 the processed fluid from the disposable microfluidic cassette onto or into a fluid receiver device.

The method generally involves ejecting a reagent fluid from a fluid dispenser device to a disposable microfluidic cassette. A variety of reagent fluids can be ejected, as described previously.

As also described previously, the sample can be pre-loaded to a disposable microfluidic cassette in fluid form or dry or powder form. Where a sample is pre-loaded in dry or powder form, the sample can be dissolved, dispersed, or activated by dispensing a fluid (e.g. water, reagent fluid, etc.) from a fluid dispenser device to the disposable microfluidic cassette to prepare the sample fluid.

The fluid, such as sample fluid and reagent, sample and reagent fluid, sample and reagent and fluid, for example, can be manipulated in a variety of ways to prepare a processed fluid. Non-limiting examples can include mixing, thermal cycling, washing, eluting, lysing, separating, sorting, transfecting, reacting, assaying, the like, or a combination thereof. However, it is noted that manipulating does not include mere movement or conveyance of fluid from one location to another. Rather, manipulating, as used herein includes something more than mere movement or conveyance of fluid.

The manipulated or processed fluid can be ejected from the disposable microfluidic cassette to a fluid receiver device. The fluid receiver device can receive the processed fluid as waste, as a fluid for assay or analysis, for further fluid manipulation, the like, or a combination thereof.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if individual numerical values and sub-ranges are explicitly recited. For example, a volume range of about 1 nanoliter (nL) to about 20 nL should be interpreted to include not only the explicitly recited limits of about 1 nL and about 20 nL, but also to include individual volumes such as 2 nL, 11 nL, 14 nL, and sub-ranges such as 10 nL to 20 nL, 5 nL to 15 nL, etc.

The terms, descriptions, and figures used herein are set forth by way of illustration and are not meant as limitations. Many variations are possible within the disclosure, which is intended to be defined by the following claims—and equivalents—in which all terms are meant in the broadest reasonable sense unless otherwise indicated.

What is claimed is:

1. A disposable microfluidic cassette, comprising:

a substrate;

an engagement feature associated with the substrate to join the cassette with a cassette-receiver of an analytical system;

a microfluidic network disposed on the substrate, the microfluidic network, including:

a fluid inlet, a fluid outlet, a sample manipulation portion fluidly coupling the fluid inlet to the fluid outlet; a light source positioned at a first side of the sample manipulation portion; and a detector positioned at a second side of the sample manipulation portion opposite the light source and configured to detect a measurable characteristic of a processed fluid within the microfluidic network;

and an ejector associated with the microfluidic network and configured to move the processed fluid out of the disposable microfluidic cassette via the fluid outlet.

2. The disposable microfluidic cassette of claim 1, wherein the engagement feature is removably joinable with the cassette-receiver of the analytical system.

3. The disposable microfluidic cassette of claim 1, wherein the microfluidic network has a volume of from 0.5 picoliters (pL) to 1 milliliter (mL).

4. The disposable microfluidic cassette of claim 1, further comprising a sample manipulation component associated with the sample manipulation portion, the sample manipulation component selected from a temperature regulator, a thermal cycler, an ultrasonic transducer, a piezoelectric appliance, an integrated micropump, a mixer, a lyser, a particle sorter, a valve, or a combination thereof.

5. The disposable microfluidic cassette of claim 1, wherein the engagement feature of the disposable microfluidic cassette is mechanically joinable with a corresponding engagement feature of the cassette-receiver of the analytical system.

6. An analytical system, comprising:

a fluid dispenser device including a fluid reservoir in fluid communication with a first fluid ejector;

a disposable microfluidic cassette positioned in operational relation to the fluid dispenser device, the disposable microfluidic cassette comprising:

a microfluidic network positioned on the disposable microfluidic cassette, said microfluidic network including:

a fluid inlet to receive the fluid from the fluid ejector when positioned in operational relation to the fluid dispenser device, a fluid outlet, sample manipulation fluidics fluidly coupling the fluid inlet to the fluid outlet where said manipulation fluidics is manipulated to form a processed fluid, and a second ejector associated with the microfluidic network and configured to remove processed fluid from the disposable microfluidic cassette via the fluid outlet; and a fluid receiver device configured to receive the processed fluid via the fluid outlet in a channel of the fluid receiver device, the fluid receiver device comprising: a light source positioned at a first side of the channel; and a detector positioned at a second side of the channel opposite the light source, and configured to detect a measurable characteristic of the processed fluid within the channel.

7. The analytical system of claim 6, further comprising a cassette-receiver adjacent the fluid dispenser device to receive the disposable microfluidic cassette in position to receive the fluid at the fluid inlet.

8. The analytical system of claim 6, wherein the fluid reservoir includes a sample fluid reservoir, a reagent fluid reservoir, or both.

9. The analytical system of claim 6, wherein the sample manipulation fluidics are pre-loaded with sample to interact with the fluid after being introduced within the disposable microfluidic cassette.

10. The analytical system of claim 7, further comprising a carriage coupled to the fluid dispenser device, the cassette-receiver, or both, to move the fluid dispenser device relative to the cassette-receiver.

11. A method of manipulating a sample, comprising:

ejecting a fluid from a fluid ejector to a microfluidic network, wherein said microfluidic network is disposed on a disposable microfluidic cassette, wherein the fluid is a sample fluid, a reagent fluid, or both;

manipulating the fluid within a microfluidic network to generate a processed fluid; emitting, via a light source positioned at a first side of a sample manipulation portion of the disposable microfluidic cassette, electromagnetic radiation into the microfluidic network;

detecting, via a detector positioned at a second side of a sample manipulation portion and opposite the light source the disposable microfluidic cassette, fluorescent emission from a nucleic acid binding die of the processed fluid within the microfluidic network; and ejecting the processed fluid from the disposable microfluidic cassette onto or into a fluid receiver device.

12. The method of claim 11, wherein manipulating comprises processing the fluid to include mixing, thermal cycling, washing, eluting, lysing, separating, sorting, transfecting, reacting, assaying, or a combination thereof, and wherein the fluid receiver device receives the processed fluid as waste, for assay, for further fluid manipulation, or a combination thereof.

* * * * *